Figure 1:
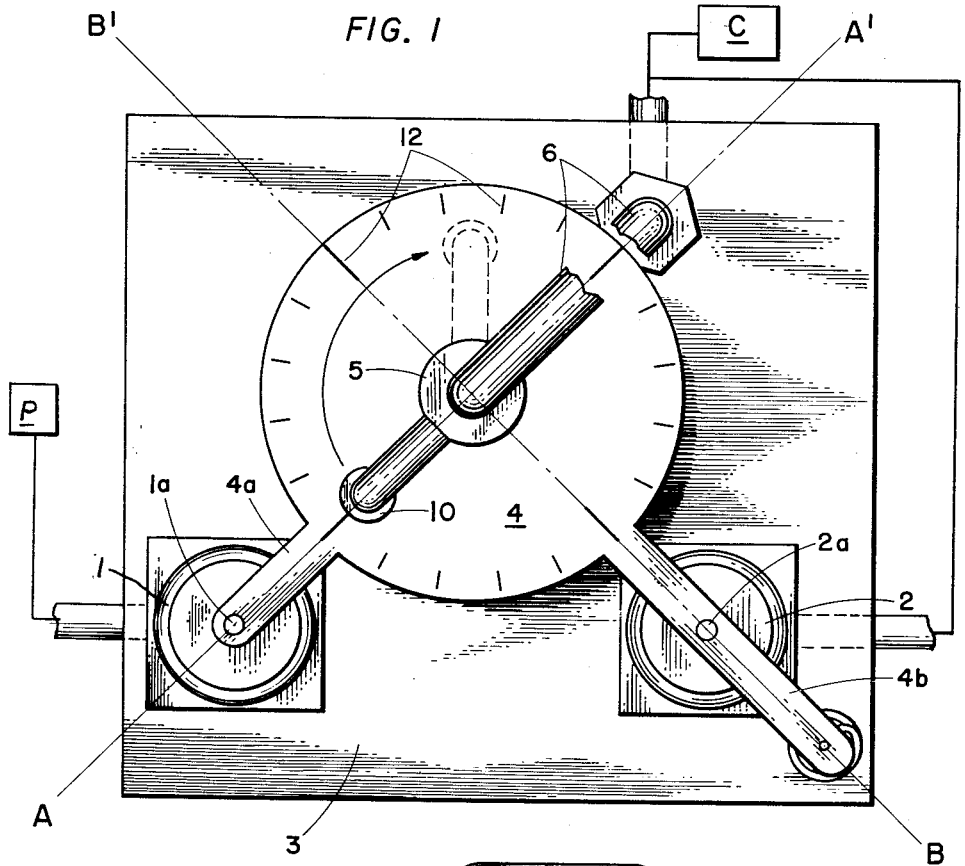

July 31, 1962  H. R. JAQUITH  3,047,002
CONTROLLER
Filed Dec. 5, 1956  3 Sheets-Sheet 1

INVENTOR.
Howard R. Jaquith
BY
P. J. Young, Jr.

July 31, 1962  H. R. JAQUITH  3,047,002
CONTROLLER
Filed Dec. 5, 1956  3 Sheets-Sheet 2

INVENTOR.
Howard R. Jaquith
BY P. J. Young, Jr.

July 31, 1962

H. R. JAQUITH 3,047,002

CONTROLLER

Filed Dec. 5, 1956

3 Sheets-Sheet 3

INVENTOR.
Howard R. Jaquith
BY P. J. Young, Jr.

United States Patent Office 3,047,002
Patented July 31, 1962

3,047,002
CONTROLLER
Howard R. Jaquith, Rochester, N.Y., assignor to Taylor Instrument Companies, Rochester, N.Y., a corporation of New York
Filed Dec. 5, 1956, Ser. No. 626,537
20 Claims. (Cl. 137—85)

This invention relates to controllers or relay devices. In general, a relay may be deemed to be a device which takes an input signal and produces an output signal which has a predetermined relation to some aspect or characteristic of the input signal. Many examples of such devices will occur to one skilled in the art: switches, pneumatic transmitters, magnetic amplifiers, and so on.

More specifically, this application relates to a relay wherein the energy of an input signal is converted to a motion and the said motion is converted to an output signal (the said motion is, of course, a signal itself).

In particular, my invention relates to a pneumatic relay having novel means to transform one or more input signals in the form of a force and/or a motion into an angular deflection. I have also provided the said relay with novel means to transform the last-mentioned motion into a pneumatic output sigal. Finally, I have incorporated in a pneumatic relay the principle of position-balancing feedback in a new and ingenious manner.

While these and other particulars of the invention are set forth hereinafter in considerable detail, I wish it to be understood that the scope of protection granted me is to be limited only by the claims appended to this application, and not by the specific example I have chosen for the purpose illustrating the invention as a function entirety.

Figure 2:
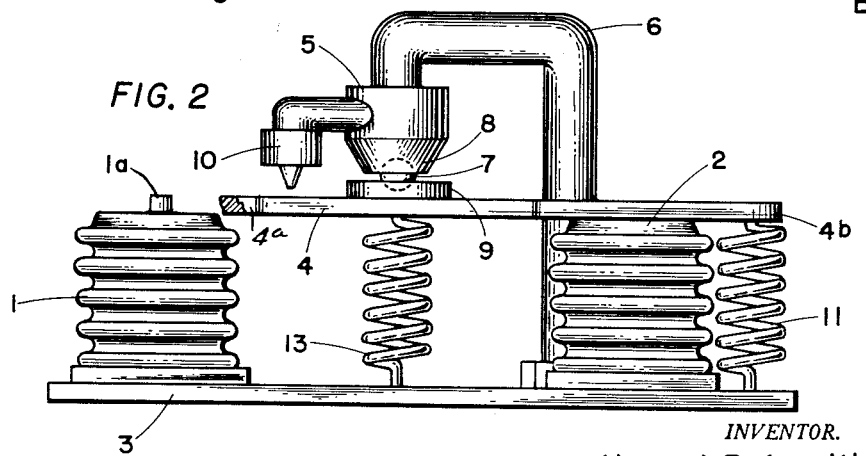
Figure 3:
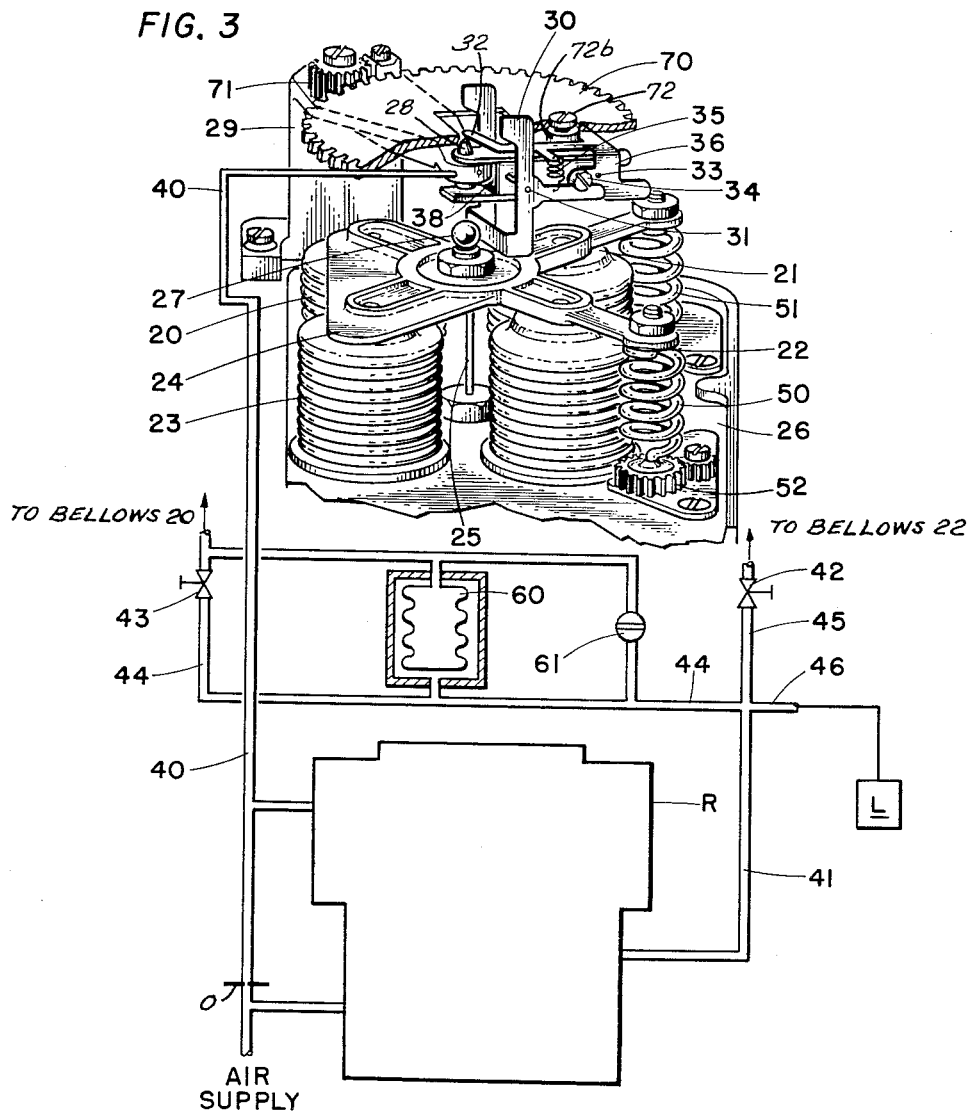
Figure 4:
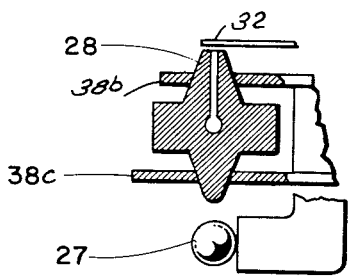
Figure 5:
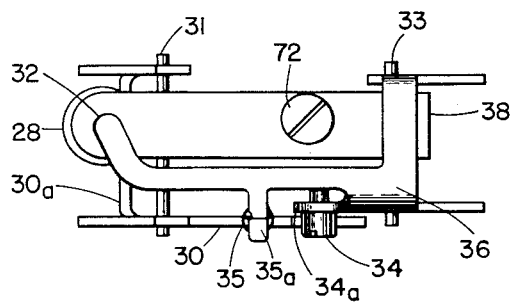
Figure 6:
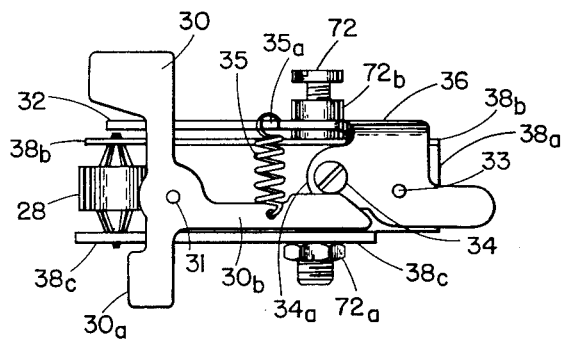
Figure 7:
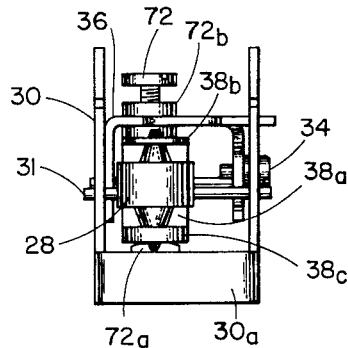

In the drawings:

FIGS. 1 and 2 are respectively a plan and an elevation of a simple form of the invention; FIG. 3 is a perspective view of a more elaborate application of the principles embodied in the form of the invention shown in FIGS. 1 and 2; FIG. 4 is an enlarged partly-sectional view of a detail of FIG. 3; and FIGS. 5, 6 and 7 are views in top plan, side elevation, and front elevation, respectively, of the baffle and nozzle mechanism shown in FIG. 3.

In FIG. 1, numerals 1 and 2 designate conventional bellows mounted on a base 3 and connected by a plate, spider or beam 4 from which arms 4a and 4b project. The said arms are perforated to receive studs 1a and 2a in the manner indicated in FIG. 2, which studs are secured to the ends of bellows 1 and 2 which bear against said arms. The arm 4b is extended beyond the periphery of bellows 2, and at its end is a bias spring 11 secured thereto and to the base 3. The spring serves to determine the relation between bellows motion and force applied to the bellows, and also supplies a certain amount of rigidity tending to prevent movement of the plate transverse to the expansion axis of the bellows.

To keep the plate 4 from translatory movement while permitting universal angular movement thereof, there are provided bearings 8 and 9 between which ball 7 is held, these elements being held assembled by compression spring 13 connected to the base 3 and plate 4. The bearing 8 is formed in the bottom of a fitting 5, which is rotatable on one end of fixed conduit 6 which latter extends across the plate 4 and is secured to the base 3 in any convenient manner. (A portion of conduit 6 is shown broken away to illustrate another detail.) A nozzle 10 is secured to fitting 5 and opens adjacent the top surface of plate 4. The fitting 5, while rotatable about the end of conduits 6, as is shown by the dashed line showing of nozzle 10 in moved position, permits permanent communication between nozzle 10 and conduits 6 without appreciable leakage from where conduit 6 enters the fitting 5. It is unnecessary to go any further in describing the nature of the connection between fitting 5 and conduit 6, since such connections are well-known in the art.

It will be apparent that nozzle 10 and the top surface of plate 4 form a nozzle and flapper couple, and accordingly conduit 6 is connected to a suitable source of pressure to produce a back pressure in conduit 6 that depends on the spacing between plate 4 and the end of the nozzle.

The use of the device may be as follows: Bellows 1 is arranged to expand or contract in response to some condition, e.g., it may be evacuated so as to respond to the pressure on its exterior, it may be connected to any source of gas or liquid pressure P such as a pipe line, a head of liquid, or any gas-filled, liquid-filled, or vapour pressure thermally responsive system, or it may simply form a hermetic seal or a mere elastic support through which some mechanical or electrical force is transmitted via a rigid or elastic member or an electro-magnetic field, etc. The bellows 2, by a means not shown, on the other hand is connected to receive in its interior the back pressure in conduit 6. Also connected to conduit 6 is a pressure responsive control device C, as for example, a valve motor, an additional relay, or the like, which it is desired to operate in accordance with the back pressure in conduit 6.

Assuming that the device of FIGS. 1 and 2 is in the position shown and that the plane of plate 4 is normal to the axis of rotation of nozzle 10 and fitting 5, with the said axis including as points thereon the center of ball 7 and the intersection of straight lines (i.e., axis A—A' and B—B' of FIG. 1) from the centers of the ends of bellows 1 and 2 drawn at right angles to each other, then, with the nozzle positioned as shown a certain back pressure $P_b$ exists in bellows 2 and conduit 6. The position of the plate with the parts aligned as just described may be termed a "neutral" position. If the upper end of bellows 1 is caused to move upward, thus causing the plate 4 to tilt about axis B—B' (looking at FIG. 2), the spacing between nozzle 10 and plate 4 would decrease, thus increasing $P_b$, which in turn would cause bellows 2 to expand and tilt the plate 4 about axis A—A'. Since axis A—A' is directly under the nozzle, the tilting of plate 4 thereabout would have little net effect on the spacing between nozzle and plate, and hence the device C would receive an increased pressure $P_b$ almost entirely governed by the action of bellows 1. If, however, had the nozzle 10 been adjusted to a position 180° removed from that shown, the expansion of bellows 1 would have dropped the back pressure in line 6, and, in terms of the pneumatic control arts, the action of the device of FIG. 1 would have been "reverse," bellows 2 contracting this time, but again without appreciable effect on $P_b$, since the nozzle opening would still lie on axis A—A'. It will be seen that the upper end of bellows 1, and ball 7 and its bearings 8 and 9, provide a pair of fulcrums forming tilt or oscillation axis A—A'. The upper end of bellows 2, ball 7 and its bearings 8 and 9, provide fulcrums forming axis B—B'. The upper end of spring 11, of course, is a third fulcrum of axis B—B', but since the three fulcrums are aligned, any two may be deemed the axis-forming fulcrums.

Again, if nozzle 10 had been at positions 90° from either side of that position illustrated, expansion of bellows 1 would have little effect on $P_b$ since then the axis B—B' would have been directly under the nozzle.

It will be seen that of the hypothetical nozzle positions thus far described, never does more than one bellows take appreciable part in the action of the device, insofar as any appreciable effect on the device C is concerned. However, if the nozzle is envisaged to be in a position 45° from any position thus far described, considerably different results are obtained. Thus, if nozzle 10 had been adjusted 45° counter-clockwise from the position shown in the drawings, expansion of bellows 1 would have caused an expansion of bellows 2 that in turn would have further decreased the nozzle spacing, i.e., regeneration would take place in that bellows 2 would expand to further choke the nozzle, thus reinforcing the initial increase in $P_b$ due to expansion of bellows 1 which is equivalent to a sort of on-off snap action. Were the nozzle 45° clockwise from the position shown, the effect of bellows 2 would be degenerative, since expansion of bellows 2 in response to increase in $P_b$ would increase the spacing between nozzle and plate 4, which in turn would tend to decrease $P_b$. At a position 90° further clockwise from the last described clockwise position, there is what might be termed reverse degeneration, since, if bellows 1 expands to increase baffle nozzle spacing, $P_b$ drops, bellows 2 contracts and decreases nozzle spacing, whereat $P_b$ increases to expand bellows 2, which now increases nozzle-baffle spacing and so on until or unless equilibrium is reached. Finally, moving 90° further clockwise, we have reverse regeneration since expansion of bellows 1 drops $P_b$, whereupon bellows 2 contracts and drops $P_b$ some more and so on.

As will be evident from the foregoing, adjustment of nozzle 10 to positions differing from those described will provide an infinite shading of the various effects just described, that is, the "gain" or ratio of input pressure change to change in $P_b$ for each of the said effects varies according to the relative position of the nozzle with respect to the boundaries of each feedback effect which bellows 2 is capable of causing. Specifically, quadrant location of nozzle determines sign, and position within a given quadrant, magnitude of the ratio. As shown, plate 4 may be graduated as at 12 to aid in setting the nozzle, the large graduations representing quadrant boundaries of the different feedback effects. For example, for high gain in direct action with degeneration, one would set the nozzle at a position only a few degrees clockwise from the nozzle position shown, and so on.

The device of FIGS. 1 and 2 is extremely versatile as to the nature of the signal output it can feed to device C, which latter may be a valve motor or any other device which is to be controlled in accordance with one of the many possible relations between the signal input of bellows 1 and $P_b$ or "gain." The versatility is due to the fact that a very simple nozzle adjustment can combine either a positive or negative feedback effect (effect of bellows 2) with either direct or reverse action (effect of bellows 1) and at the same time continuously vary the relation of action to effect (again "gain") from high positive values to high negative values in two complete cycles per revolution of nozzle 10. Moreover, adjustment of nozzle 10 has no direct effect on bearing loading, and as a matter of fact has substantially no effect at all if adjustment is carried out with the plate in the aforementioned neutral position taken as starting point when describing the various modes of operation supra, i.e., with plate 4 in neutral position one might say that the nozzle moves in an equipotential path with respect to the top of plate 4.

While for simplicity the graduations 12 have been shown as uniformly spaced, the magnitude of the gain change resulting from a given change in angular position of the nozzle is not linearly related to nozzle position. This is obvious since, taking the quadrant immediately clockwise from the nozzle as shown, as an example, the ratio between a given plate deflection about axis B—B' and the plate deflection about axis A—A' needed to exactly counter said given plate deflection, is proportional to the tangent of the angle between a normal drawn from the axis of rotation of the nozzle to its orifice and a normal drawn from said axis to the most clockwise extreme of said quadrant.

If spring 13 is sufficiently stiff, bearings 8 and 9 and ball 7, may be dispensed with; and the plate attached to the spring to restrain appreciable translation thereof. The spring itself may be in the form of a bar, strip or wire (as shown at 25 in FIG. 3, for example) elastically bendable and torsionable. An elastic pivot is desirable since a sliding bearing does introduce friction, which varies depending on its overall loading.

Again, plate 4 and fitting 5 may be fastened together with a ball and socket joint serving to support the plate as well as to permit angular deflection thereof, and rotatable adjustment of nozzle 10. In any event, what is required is a sort of universal hinge.

With the wire hinge of FIGURE 3, on the other hand, the deflections of the plate do not take place about a single point at which all axes of deflection intersect, since each axis is determined by the stiffness of the wire, bellows, and bias springs, the location of points of connection of same to the plate, and other elastic characteristics of the bellows, springs and wire, none of which characteristics represent absolute restriction on the degrees of freedom permitted the plate, except, of course, that the wire is substantially inextensible and thus plays a major part in localizing axes of deflection. Nevertheless, except for slight hysteresis effects, the behaviour of the relay is determinate, repeatable and satisfactorily approximates the fictional case of pure angular deflection of the plate.

The device of FIGS. 1 and 2, while serving the purpose of illustrating the essentials of the invention does not possess all of the refinements of function often desired in the modern controller. Hence, I will now describe my invention in the form it would be more likely to be found in practice. However, this is not to say that the device of FIGS. 1 and 2, or, for that matter that certain subcombinations of elements set out in the combinations I disclose herein, are not worthy of the protection of letters patent.

In FIG. 3, I depict my invention as it might be found in a full-fledged, present day control system, including a number of refinements of certain of the elements shown in FIGS. 1 and 2.

In FIG. 3, bellows 21 and 20 correspond to bellows 1 and 2, respectively, of FIG. 1, and plate 24 to plate 4 of FIG. 1. However, bellows 20 and 21 are supplemented by bellows 23 and 22, which permit respectively, what is known in the art as set point and reset. The thrust of the group of bellows is opposed by a wire 25 connecting the plate 24 to the base 26 to which are fixed the lower ends of the bellows. Wire 25 thus corresponds to the bearing and spring support of plate 4 of FIG. 1. The centers of the bellows lie substantially on a circle whose center coincides with the points of attachment of wire 25 to plates 24 and 26. Thus plate 24, like plate 4, is capable of universal tilting movement, with the important difference, that the wire rod or strip 25 introduces no bearing friction which varies as the gross thrust on the plate as does the ball-type thrust bearing shown in FIG. 2. Wire 25 may be quite stiff or quite slack as long as it remains substantially fixed in length, does not vary appreciably in its resistance to bending about the several axes of tilting of plate 24, and does not tend to set appreciably. However, because directional variation in resistance to bending may be tolerated in large amounts, particularly since it may be lumped with the elastic reactions introduced by the bellows and bias springs, considerable variation in the form of the element connecting plate 24 to base 26 is possible. For example, a helical spring, a twisted flat spring, and, in general, any connecting element not involving sliding parts will give the desired results. Moreover, hysteresis effects with such pivots are negligible. It will be seen that the rod or wire 25 and the various bellows and springs of FIGURE 3 provide plate fulcrums forming plate-tilt axes like A—A' and B—B' of FIGURE 1, as do their fewer counterparts in the species of FIGURES 1 and 2.

On the top of plate 24 is fixed a ball 27 which corresponds to the baffle area of plate 4, with the difference that instead of being a baffle itself, the ball cooperates with a baffle operating linkage comprising a crank 30, against an arm of which ball 27 bears and which is pivoted for movement at 31, and another crank 36 pivoted at 33 and having an end which defines a baffle 32. The two cranks are held together by a light spring 35 which presses a baffle cam 34 against the arm of crank 30, baffle cam 34 being a suitable element projecting from crank 36 and secured thereto, as shown in FIGURE 3. The pivots 31 and 33 are supported by the carrier 38 at points spaced from the point at which the baffle 32 coacts with a nozzle 28. Post 29 fixed to base 26, for convenience combines the functions of a conduit to supply air to nozzle 28 and a support upon which carrier 38 is mounted for pivotal movement of said carrier about said nozzle, as is evident from FIGURES 3 and 4. If the center of ball 27, the effective point of attachment to plate 24 of wire 25, the orifice of the nozzle and the pivot axis of carrier 38 fall on substantially the same straight line, the carrier can be rotated without causing ball 27 to change its spacing with respect to the arm of crank 30. Any deflection of ball 27, however, toward or away from the adjacent arm of crank 30 will result in pivotal movement of crank 30, pivotal movement of crank 36, and change of spacing between nozzle and baffle. Preferably, the range of movement of the baffle operating linkage is such that in neutral position of the plate 24 a very slight movement of the adjacent arm of crank 30 will either completely cap or completely uncap the nozzle. In the arrangement shown, movement of ball 27 toward the adjacent arm of crank 30 will uncap the nozzle, since said movement will deflect crank 30 counterclockwise (as viewed in FIGURE 3), which deflection is transferred via baffle cam 34 to crank 36 and causes crank 36 to deflect clockwise, thus moving the baffle portion of crank 36 away from nozzle 28. In this particular case, range of baffle movement is dictated by the use of booster relay R, follow up, and other effects, which eliminate any need to provide any considerable range of nozzle throttling.

Turning now to FIGURES 5, 6 and 7 for a more detailed consideration of the baffle and nozzle mechanism of FIGURE 3, carrier 38 is shown as consisting of a body 38a sandwiched between a pair of strips 38b and 38c, the said strips extending beyond one extremity of the body 38a so as to provide a pivotal mounting for the said carrier. The projecting portions of said strips are provided with perforations, as evident from FIGURE 4, snugly mating with the conical portions of the nozzle 28, the whole being held together by a screw 72, stud 72b, and nut 72a, or any other convenient means. This composite construction of the carrier 38 is obviously but one of many ways of providing easy assembly of carrier and nozzle.

As is evident from FIGURES 6, 7 and 8, cranks 30 and 36 are essentially pivoted U-shaped members having various arms projecting therefrom, and each extends around carrier 38 as shown to provide for passing pin-type pivots through carrier body 38a and the ends of the U-portions of each crank. Thus, crank 30 is pivotally supported on body 38a by pivot 31 and crank 36 by pivot 33.

It will be seen from the figures that one arm of crank 30 extends back toward crank 36, and one arm of the latter extends forward toward crank 30, each said arm being of sufficient length that the extremities thereof can be arranged approximately side by side, as shown. The said arm of crank 36, however, has baffle cam 34 projecting therefrom far enough to allow its said arm to be supported by the said arm of crank 30, whereby if crank 30 be pivoted such as to lift its said arm, it will also lift the said arm of crank 36 by means of cam 34.

In order to assure that the said arm of cam 36 will follow exactly the said arm of crank 30, if the latter said arm be lowered by pivoting crank 30 clockwise about pivot 31, the two said arms are biased together. Since the crank 36 has a second arm which extends toward the nozzle 28 and has its end formed as baffle 32, it is convenient to provide this second arm with an extension 35a and to arrange a spring 35 in tension between extension 35a and the said arm of crank 30, whereby to draw the last said arm and cam 34 together. As a result, whether crank 30 be pivoted clockwise or counter-clockwise, the crank 36 will be caused to pivot, without lost motion, in the opposite sense, whereby baffle 32 will move, substantially vertically, to uncover or uncover the orifice of nozzle 28, depending on the sense in which crank 30 pivots about pivot 31.

Crank 30 is also provided with an intermediate portion 30a projecting downward from carrier 38 and contacting ball 27. Hence, if ball 27 moves such as to move into the portion 30a, crank 30 will pivot counter-clockwise, with the result that baffle 32 will be moved away from nozzle 28. If the ball tries to move back, away from the portion 30a, the portion 30a will follow the ball 27, with the result that baffle 32 will move toward the nozzle.

From the foregoing, it will be seen that since in the neutral position, described before, the baffle just throttles the nozzle sufficiently to maintain the bellows pressures required to hold the plate 24 in the neutral position, movement of ball 27 in any way other than that parallel to the surface of its contact with portion 30a, will change the nozzle back pressure and, eventually, the output pressure into load L. In practice, of course, such movement results if there is a deviation of the process pressure from the set point pressure. Since such deviation tends to limit the direction of ball motion to that imparted by tilt of plate 24 about what, in terms of FIGURE 1, would be the controller's B—B' axis, it is evident that the sense of the back pressure change in nozzle 28 and the magnitude thereof, for a given deviation, depends on the angular orientation of carrier 38 with respect to the nozzle axis; likewise as to the feedback effect that follows upon nozzle back pressure change.

The relay R is conventional and is used in the usual fashion. The line 40 feeds the nozzle 28 from the usual regulated supply of air and is connected to the relay R, also supplied with air, to actuate the relay R to drop its air output or increase its output accordingly as to whether the nozzle 28 is, respectively, uncapped or capped by the baffle 32. An output line 41 branches off with lines 44, 45 and 46, which respectively go to the bellows 20, bellows 22, and to some load L which may be a valve motor, etc. Bellows 23 is fed by a separate source of pressure not shown which may be set at different fixed pressures, as well known in the art, to cause the device of FIG. 3 to produce an air output tending to maintain the load on line 46 in some state affecting a condition which is measured, the measurement being fed to bellows 21 as a pressure to be compared with the set point pressure in bellows 23, in order that the instrument may respond accordingly. I provide an adjustable restrictor 43 in line 44, in order to delay the follow up action of bellows 20 so that the immediate control effect resulting from a motion of baffle 32 in response to a signal is enhanced. Likewise, a variable restrictor 42 is placed in line 45 to aid the follow up bellows in restoration of the condition of the load on line 46 to the desired control-point, i.e., restrictor 42 supplies what is referred to in the control art as "reset." Likewise, the effect of restrictor 43 may be modified by bypassing it with a capacity represented by bellows 60 connected as shown in parallel with restrictor 43, communication of the interior of bellows 60 with the pressure in line 44 being controlled by valve 61. If valve 61 is open, restrictor 43 has no effect, but if the valve is closed, the delay introduced by restrictor 43 is modified by the bellows since the bellows will eventually transmit some of any disturbance being transmitted between bellows 20 and the relay when a change in output pressure in line 41 occurs.

The use of set point and reset bellows and the particular pneumatic circuit, contributes only algebraically additive and in part transient effects to those exerted by bellows 21 and 29, which supplement the effects described in detail in connection with FIG. 2. Hence, it is unnecessary to undertake any further explanation of the workings of the invention as shown in FIG. 3. However, it will be noted that when process variable deviation from the control point causes change in the pressure in bellows 21, baffle-nozzle spacing changes, and follow-up bellows 20 reacts to oppose this spacing change. Likewise, reset bellows 22 will react, but in opposition to the reactions of follow-up bellows 20. Since bellows 20 and 22 are diametrically opposite, both their forces and their effects on baffle-nozzle spacing change are opposed. Hence, as the controller restores the process variable to the set or control point, follow-up bellows 20 and reset bellows 22 balance each other out until finally, the process variable is back at the set point and equal pressures in bellows 20 and 22 exist, counterbalancing the moments of force created in plate or beam 24 by bellows 20 and 22.

As shown in FIG. 3, a dial 70 may rotate with the baffle operating linkage and may be graduated in terms of the gain, analogous to the graduations of plate 4, FIG. 1. Fine settings of the dial may be made by spur gear 71, and the rotatable baffle assembly may be arranged so that it will stay in whatever position to which it is adjusted, as by taking advantage of the friction of a tight fit of rotatable carrier 38 and the nozzle or other fixed element on which it is pivotally supported.

As was remarked before, the screw 72, nut 72a and stud 72b are used to hold the composite carrier 38 together. Another function of these elements, however is to provide a convenient mode of supporting the dial 70 on carrier 38 so that carrier 38 and dial 70 can be rotated together, as aforesaid. As shown, the dial 70 is cut out centrally to accommodate projecting portions of crank 30 and to provide freedom of movement for baffle 32. Likewise, the stud 72, as indicated by the drawing, provides sufficient clearance between dial 70 and the carrier 38 to permit crank 36 to operate, as described, supra.

As in the case of the species of FIGURES 1 and 2, it is convenient to bias the plate. For this purpose, a pair of springs 50 and 51 may be provided as bias springs, and made adjustable as by geared connections 52 by operation of which one end of the spring threads in or out of the connections. Likewise, the connections of the bellows to the base and to the plate 24 may be made adjustable, since it is desirable that as little stress as possible (other than that necessarily involved by tilting action of the plate) in any direction but that along the direction of expansion of the bellows, should be exerted on the bellows. In this way, it is assured that the moments of force created in the plate 24 by the several bellows will be as nearly as possible symmetrically applied and, at the same time, stress on the bellows will be at a minimum. Adjustability, of course, also aids in assembling the parts with sufficient geometrical and/or physical symmetry as to have a neutral position, such as described supra, wherein adjustment of the rotatable nozzle of FIGS. 1 and 2 or of the baffle operating linkage of FIG. 3 to different angular positions, has little or no effect on output or back pressure.

The device of FIG. 3 is not physically arranged so as to obtain the full scope of relations between input and output since ordinarily only direct and reverse action with negative feedback or degeneration are required. However, there are control situations where the regenerative action is required. For example, if it is desired to have the relay "lock in," i.e., maintain relay output at one or another of two different pressures depending on whether or not the input to the relay exceeds or falls short of some given input value, regeneration will assure that the relay will maintain an unchanging output in the face of changes in input that are not large enough to cause the input to reach said given input value. Only the routine skill of the artisan would be required to modify the mechanical design of the controller of FIGURE 3 so as to provide the "lock in" feature and I consider such modifications to fall within the purview of my claims.

It will be seen that I have invented a novel relay of great versatility while utilizing parts relatively few in number and structurally simple, in an arrangement that is easily assembled and adjusted. After the assembly has been squared and otherwise adjusted into operational condition, only one operating adjustment is necessary, to wit, the angular position of nozzle, or of baffle, which adjustment has substantially no effect on the operation of the assembly other than, at most, that which it is the purpose of the adjustment to establish, namely, gain and relation of input to output of the relay.

The only friction or hysteresis phenomenon of any appreciable effect is the hysteresis of the bellows (or other input elements that might be used to provide the forces summed up by the beam or plate 24), friction being substantially eliminated by the use of the flexible pivot, which itself is in effect hysteresis-free, insofar as its use here is concerned. Bellows hysteresis can be satisfactorily minimized by careful design and choice of bellows, springs, the materials thereof, and the amount of movement permitted the parts. Hysteresis, of course, is inherent in any spring-utilizing instrument having position-balancing, but the advantages of this balancing principle—its application adds little to the force load on the instrument and causes no reversal of net forces in the instrument—more than offset the hysteresis encountered in practice.

The claims to follow are intended to cover all reasonable equivalents established by the variety of my disclosure, except of course, where the clear intent of the language of the claim is to limit the claim to a more narrow interpretation.

I claim:

1. In combination, a plate, a support; elongated, flexible means connecting a place on said plate to said support, said flexible means being substantially inextensible along its length, whereby said flexible means forms a universal hinge permitting said plate to tilt about a plurality of axes at least approximately intersecting at said place, condition responsive means mounted on said support and operatively connected to said plate for tilting said plate about one of said plurality of axes in response to said condition, detecting means for sensing tilting of said plate, feedback means mounted on said support for tilting said plate about another of said plurality of axes, said feedback means being responsive to detection by said detecting means of plate tilting so as to tilt said plate about said another of said plurality of axes, said plate being elastically supported on said support in a position such that said elongated flexible means is under tension and its length is transverse to the plane of said plate.

2. A ratio relay, including in combination, stationary means providing a pivot, a rigid spider mounted on said stationary means for universal tilting movement, about a plurality of axes simultaneously, relative to said stationary means, a plurality of input elements each bearing on said spider and causing a moment of force on said spider about said pivot, each of said input elements being located diametrically opposite to another, said input elements providing two pairs of fulcrums forming two axes about which said spider oscillates, first means operable in response to movements of said spider to vary a first supply of power, first means applying said first power to one of said input elements and causing a moment of force on said spider opposing the moment of force applied by one of said input elements, said moments of force counterbalancing each other and causing said slider to assume a position which represents a mathematical function of said moments of force.

3. A relay including in combination, stationary means including a pivot, a rigid spider, said pivot mounting said spider on said stationary means and providing universal tilting movement of said spider about a plurality of axes simultaneously, relative to said stationary means; a plurality of inputa elements each bearing on said spider and exerting a force on said spider about said pivot, a first of said input elements and said pivot being located so as to provide a pair of fulcrums forming a first axis about which said spider oscillates, a second of said input elements being located so as to provide with said pivot another pair of fulcrums forming a second axis about which said spider oscillates, means operable in response to oscillation of said spider about said first axis to vary a supply of power, means applying said power to said one of said input elements and causing the force on said spider exerted by said first of said input elements to oscillate said spider about said second axis, said first and said second axes being separate from each other, and the position of said spider representing the summation of the forces exerted thereon by said input elements.

4. A relay including in combination, stationary means including a pivot, a rigid spider, said pivot mounting said spider on said stationary means and providing universal tilting movement of said spider about a plurality of axes simultaneously, relative to said stationary means; a plurality of input elements each bearing on said spider and exerting a force on said spider about said pivot, a first of said input elements and said pivot being located so as to provide a pair of fulcrums forming a first axis about which said spider oscillates, said pivot and a second of input elements being located so as to provide another pair of fulcrums forming another axis about which said spider oscillates, said axes being separate from each other and said forces causing said spider to assume a position which represents the summation of said forces.

5. In a relay device, the combination comprising a beam, first motor means arranged to deflect said beam about a first given axis; second motor means arranged to deflect said beam about a second given axis intersecting with said first given axis, said beam being mounted for universal tilting motion relative to the point of intersection of said axes, but being otherwise substantially fixed in spatial position, said beam having a part projecting above the plane defined by said axes, said part having a surface portion that is radially symmetrical with respect to an axis normal to said plane, signal producing means including a movable member mounted for movement over said surface portion, said movement being in a given path extending along said surface portion and parallel to said plane, said movable member being constructed and arranged to be moved to and left at any place in said path, said movable member also mounted for movement transverse to said path in response to deflection of said beam such as to urge said part against or away from said movable member at said place, said signal producing means being constructed and arranged to produce a signal characterized by the amount of motion of said movable member transverse to said path, in response to deflection of said beam, whereby for a given deflection of said beam about one said axis, signal production by said signal producing means will be characteristic both of the position of said movable member with respect to said path and the amount of deflection of said beam.

6. In combination, a support, a plurality of chambers adapted to be connected to sources of variable pressure having fixed ends and movable ends, said chambers being expansible and contractible in response to variations in the pressures of said sources so as to move said movable ends toward and away from said fixed ends, the fixed ends thereof being mounted on said support, a pair of said chambers having the movable ends thereof oriented so that their movements have components generally parallel with each other, and toward and away from said support, a beam interconnecting the movable ends of said pair of chambers, the interconnections between the last said movable ends and said beam defining a pair of spaced points on said beam at which said components are applied to said beam, said pair of chambers being so proportioned and arranged that said points define a straight line transverse to the general direction of said components; and elongated inextensible means flexible transverse to its length, said elongated inextensible means having its length substantially parallel to said components, having its one end rigidly connected to said support and having its other end fixed to said beam, said other end being rigidly connected to said beam; said elongated inextensible means, including its said ends, being spaced from a plane extending in said general direction and containing said straight line, said elongated, inextensible means substantially preventing translation of said beam away from said base in said general direction, while permitting tilting of said beam about a plurality of axes intersecting in the vicinity of said other end of said elongated inextensible means.

7. The invention of claim 6, including tilt responsive means, said tilt responsive means being responsive to beam tilt on a given axis to produce a pressure change having a sense corresponding to the sense of said beam tilt, one of said chambers being operatively connected to said tilt-responsive means so as to be responsive to said pressure change to expand or contract depending on the sense of said beam tilt relative to said axis, so as to tilt said beam also.

8. A relay comprising a plurality of motion producing means, each said motion producing means being arranged to produce motions in substantially the same direction as the motions produced by the other said motion-producing means, a substantially rigid plate arranged to receive the said motions of said plurality of motion-producing means, universal hinge means, said universal hinge means being connected to a first place on said plate and effective to apply a restraint at said first place such as to prevent translatory movement of said plate in the direction of said motions, said universal hinge also having elements at said first place that are deflectible relative to each other about a plurality of axes intersecting substantially at said first place, said plate being secured to one of said elements for deflection about said axes; there being two of said motion-producing means arranged such that one thereof applies its said motions to said plate at a second place thereon spaced from said first place, and such as to cause said plate to deflect about one of said axes, and such that the other thereof applies its said motions to said plate at a third place thereon spaced from said first place and from said second place, and such as to cause said plate to deflect about another of said axes.

9. The invention of claim 8, wherein said universal hinge is a substantially inextensible means having one portion fixed to said plate at said first place and another portion maintained in a position fixed with respect to said motions, said one portion being universally deflectible with respect to said another portion, said one and another portions corresponding to said elements.

10. The invention of claim 9, wherein said inextensible means is an elongated, wire-like, linear member wherein the extremities thereof correspond to the said one and another portions.

11. The invention of claim 8 including means for producing signals in response to plate deflections, one of said two motion-producing means being responsive to said signals to produce its said motions.

12. The invention of claim 8, wherein said plate includes a part projecting therefrom, said part having a peripheral contour that is circular relative to a circle axis transverse to said plate, a first lever being supported independently of said plate for rotation about said circle axis, a second lever pivoted on said first lever for deflection on an axis transverse to said circle axis, one end of said second lever being arranged in contact with said peripheral contour, and means responsive to deflections of said second lever to produce signals.

13. The invention of claim 8, wherein said motion-producing means are chambers having movable ends and fixed ends; the fixed ends thereof being fixed with respect to the said motions, and the said movable ends bearing on said plate, each said chamber being expansible and contractible in response to a condition for producing said motions as motions of its movable end relative to its fixed end.

14. In combination, a rigid plate, at least three pressure responsive devices having parts movable generally parallelly in response to pressure, said parts being connected to said plate at regions spaced around a circle generally normal to the direction of movement of said parts; one of said pressure responsive devices being responsive to a pressure, a second of said pressure responsive devices being responsive to a pressure; said plate being mounted by a universal hinge constructed and arranged for preventing translation of said plate transversely of the plane of said circle, while permitting deflection of said plate about axes intersecting in a region located substantially at said hinge, the effective location of which region is substantially on a line normal to the plane of said circle at its center; a couple comprising a baffle and a nozzle positioned to change spacing therebetween upon angular movement of said plate with respect to a position in which the pressure response of the said devices is such as to determine a given baffle-nozzle spacing, said baffle and nozzle being constructed and arranged to cause a pressure to be applied to a third of said pressure responsive devices and to cause the last-mentioned pressure to vary in magnitude in correspondence with the spacing between said baffle and nozzle; whereby, if one of the first and second mentioned pressures changes in value, deflection of the said plate changes baffle-nozzle spacing so that there results a change in magnitude of pressure applied to said third of said pressure responsive devices.

15. The invention of claim 14, including a fourth pressure responsive device located substantially diametrically opposite the said third of said pressure responsive devices, said fourth pressure responsive device being arranged to respond to change in pressure applied to said third of said pressure responsive devices so as to introduce a transient effect on deflection of said plate in response to the last said change in pressure.

16. In combination, a rigid plate, at least three pressure responsive devices having parts movable generally parallelly in response to pressure, said parts being connected to said plate at regions spaced around a circle generally normal to the direction of movement of said parts, one of said pressure responsive devices being responsive to a pressure, a second of said pressure responsive devices being responsive to a pressure, said plate being mounted by a universal hinge constructed and arranged for preventing translation of said plate while permitting deflection of said plate about axes intersecting in a region located substantially at said hinge, the effective location of which region is substantially on a line normal to the plane of said circle at its center; a coupled comprising a baffle and a nozzle positioned to change spacing therebetween upon angular movement of said plate with respect to a position in which the pressure response of the said devices is such as to determine a given baffle-nozzle spacing, said baffle and nozzle being constructed and arranged to cause a pressure to be applied to a third of said pressure responsive devices and to cause the last-mentioned pressure to vary in magnitude in correspondence with the spacing between said baffle and nozzle, said nozzle opening in the direction of said line, and one of said baffle and said nozzle is rotatable relative to the other about said line as an axis; whereby, if one of the first and second mentioned pressures changes in value, deflection of the said plate changes baffle-nozzle spacing so that there results a change in magnitude of pressure applied to said third of said pressure responsive devices, the last said change depending on the rotary position of said one of said baffle and said nozzle relative to said axis.

17. The invention of claim 16, wherein said plate has a surface constituting said baffle, said nozzle opens toward said surface, and said nozzle is rotatable about said axis in a path passing over the said surface of said plate.

18. In combintion, a rigid plate, at least three pressure responsive devices having parts movable generally parallelly in response to pressure, said parts being connected to said plate at regions spaced around a circle generally normal to the direction of movement of said parts, one of said pressure responsive devices being responsive to a pressure, a second of said pressure responsive devices being responsive to a pressure, said plate being mounted by a universal hinge constructed and arranged for preventing translation of said plate, while permitting deflection of said plate about axes intersecting in a region located substantially at said hinge, the effective location of which region is substantially on a line normal to the plane of said circle at its center; a couple comprising a baffle and a nozzle positioned to change spacing therebetween upon angular movement of said plate with respect to a position in which the pressure response of the said devices is such as to determine a given baffle-nozzle spacing, said baffle and nozzle being constructed and arranged to cause a pressure to be applied to a third of said pressure responsive devices and to cause the last-mentioned pressure to vary in magnitude in correspondence iwth the spacing between said baffle and nozzle, said nozzle being fixed and opening in the direction of said line; a linkage connected to said plate to be actuated by deflection thereof, said linkage comprising a link responsive to plate-deflection so as to deflect about an axis transverse to said line, said linkage being rotatable about said line to vary the angle between the said axis transverse to the said line and the plane of deflection of said plate, and said baffle is responsive to deflection of said link about the last said axis to vary said baffle-nozzle spacing; whereby if one of the first and second mentioned pressures changes in value, deflection of the said plate changes baffle-nozzle spacing so that there results a change in magnitude of pressure applied to said third of said pressure responsive devices, the last said change depending on the said angle.

19. In combination, a plate, a support, said plate being mounted on said support for universal tilting movement, said plate defining a plane spaced from said support; universal hinge means interconnecting said support and a first place on said plate, said universal hinge means being constructed and arranged to prevent translation of said plate transverse to said plane while permitting said plate to tilt simultaneously about each of a plurality of axes intersecting substantially at said first place; first condition responsive means effectively mounted on said support, said first condition responsive means being constructed and arranged to apply motion to a second place on said plate and in said direction, so as to tilt said plate; second condition responsive means effectively mounted on said support, said second condition responsive means being constructed and arranged to apply motion to a third place on said plate and in said direction, so as to tilt said plate; said places being spaced, each from the others, with respect to said plane.

20. The invention of claim 19, including detecting means responsive to plate tilt to vary a condition, and one of said condition responsive means being responsive to said condition to apply motion to said plate in accordance with the variation in the said condition.

(References on following page)

References Cited in the file of this patent

UNITED STATES PATENTS

| | | |
|---|---|---|
| 2,177,908 | Muselier | Oct. 31, 1939 |
| 2,524,602 | Rosenberger | Oct. 3, 1950 |
| 2,585,347 | Robins | Feb. 12, 1952 |
| 2,632,456 | Breedlove | Mar. 24, 1953 |
| 2,652,066 | Bowditch | Sept. 15, 1953 |
| 2,675,015 | Gorrie | Apr. 13, 1954 |
| 2,675,818 | Gallo et al. | Apr. 20, 1954 |
| 2,717,611 | Lerousseau et al. | Sept. 13, 1955 |
| 2,736,199 | Ibbott | Feb. 28, 1956 |
| 2,742,917 | Bowditch | Apr. 24, 1956 |
| 2,746,385 | Smerke | Sept. 11, 1956 |